Figure 1:
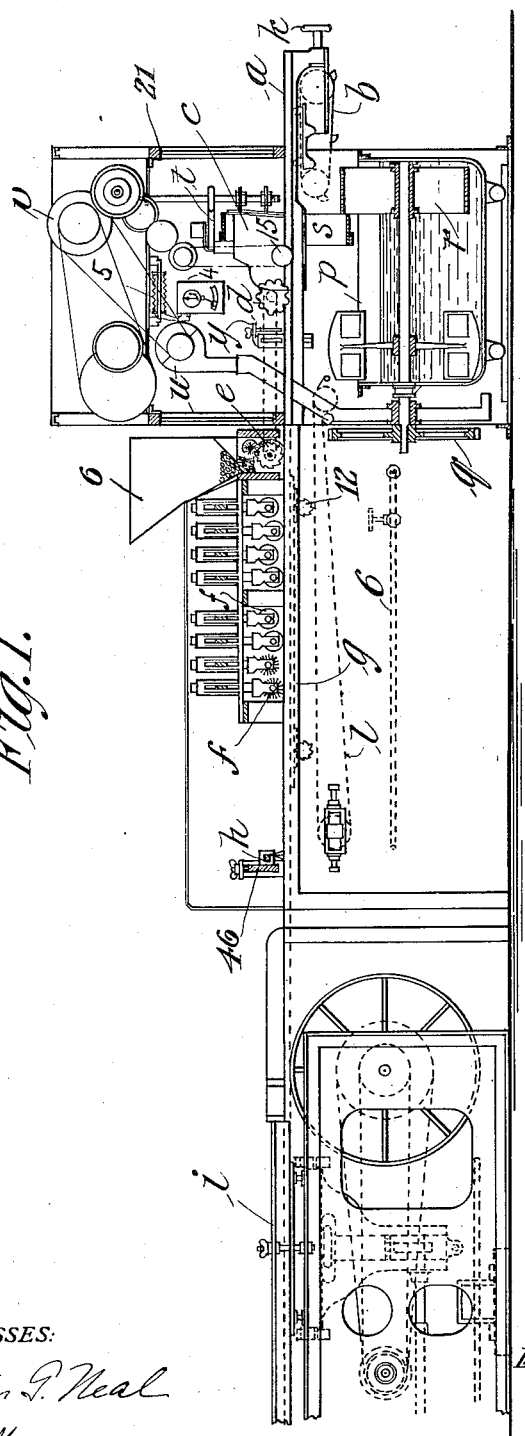

E. L. A. SAVY.
APPARATUS FOR MOLDING CHOCOLATE OR THE LIKE CONTAINING PRESERVED FRUITS, ALMONDS, OR OTHER HARD BODIES.
APPLICATION FILED AUG. 19, 1911.

1,110,404.

Patented Sept. 15, 1914.
3 SHEETS—SHEET 1.

WITNESSES:
Franklin P. Neal
R. M. Mowry

INVENTOR,
Emile Louis Alfred Savy,
BY Chapin & Co
ATTORNEY.

E. L. A. SAVY.
APPARATUS FOR MOLDING CHOCOLATE OR THE LIKE CONTAINING PRESERVED FRUITS, ALMONDS, OR OTHER HARD BODIES.
APPLICATION FILED AUG. 19, 1911.
1,110,404.
Patented Sept. 15, 1914.
3 SHEETS—SHEET 2.
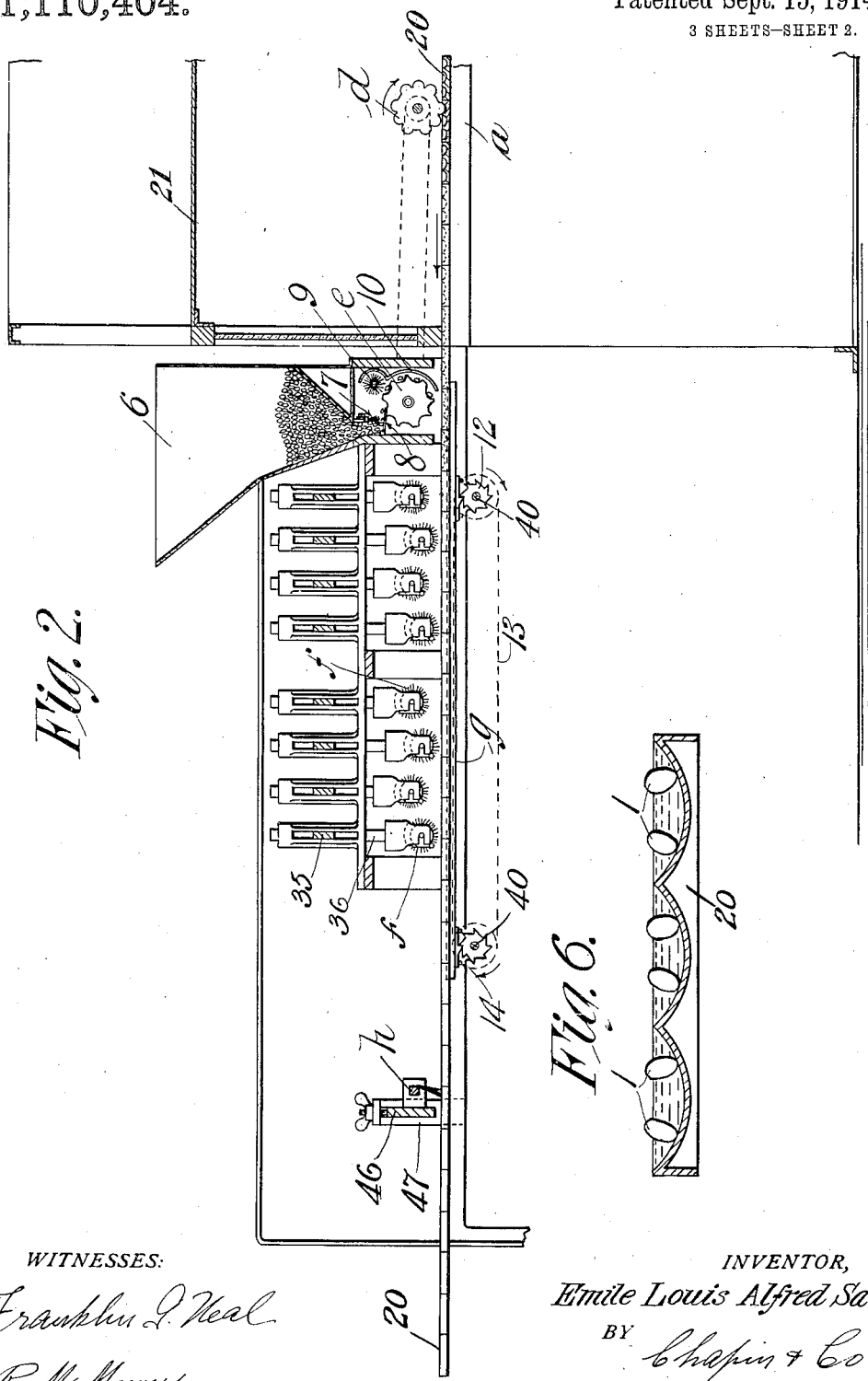
WITNESSES:
Franklin L. Neal
R. M. Mowry
INVENTOR,
Emile Louis Alfred Savy,
BY Chapin & Co
ATTORNEY.

E. L. A. SAVY.
APPARATUS FOR MOLDING CHOCOLATE OR THE LIKE CONTAINING PRESERVED FRUITS, ALMONDS, OR OTHER HARD BODIES.
APPLICATION FILED AUG. 19, 1911.
1,110,404.
Patented Sept. 15, 1914.
3 SHEETS—SHEET 3.
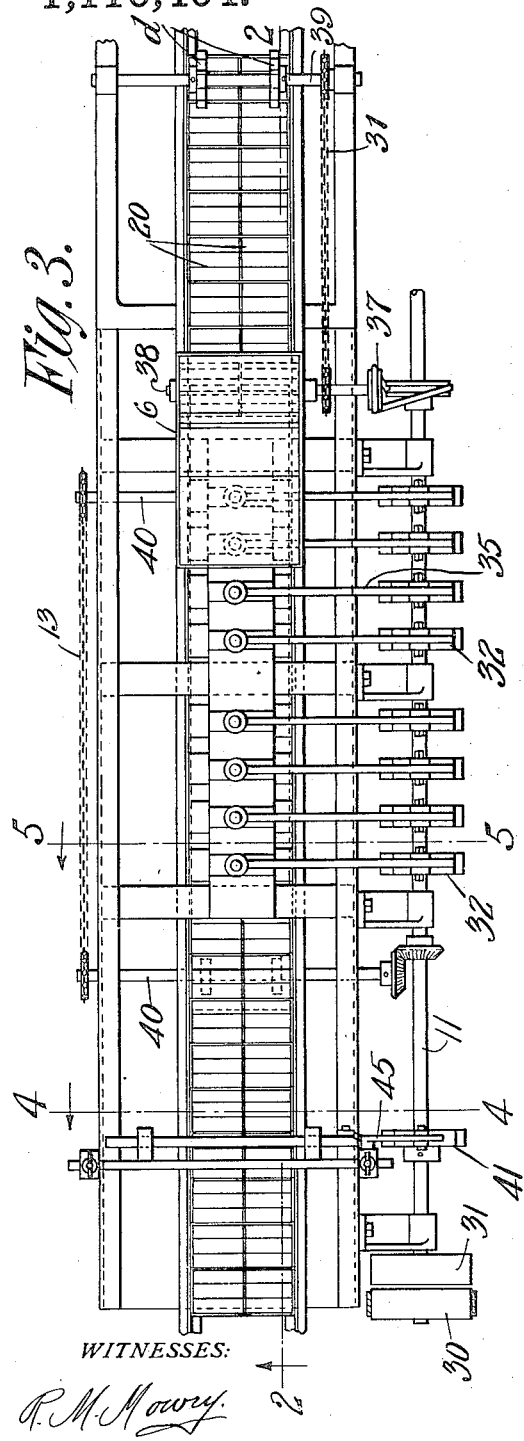
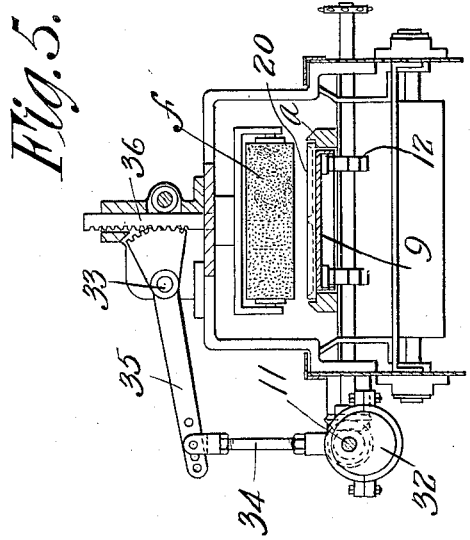
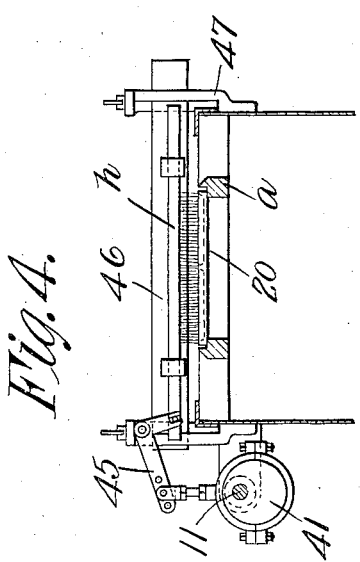
WITNESSES:
R. M. Mowry.
Franklin G. Neal.
INVENTOR,
Emile Louis Alfred Savy,
BY Chapin & Co.
ATTORNEY.

UNITED STATES PATENT OFFICE.

EMILE LOUIS ALFRED SAVY, OF PARIS, FRANCE.

APPARATUS FOR MOLDING CHOCOLATE OR THE LIKE CONTAINING PRESERVED FRUITS, ALMONDS, OR OTHER HARD BODIES.

1,110,404. Specification of Letters Patent. Patented Sept. 15, 1914.

Application filed August 19, 1911. Serial No. 644,977.

*To all whom it may concern:*

Be it known that I, EMILE LOUIS ALFRED SAVY, a citizen of the Republic of France, residing at Paris, in Department de la Seine, France, have invented new and useful Improvements in Apparatus for Molding Chocolate or the like Containing Preserved Fruits, Almonds, or other Hard Bodies, of which the following is a specification.

It has hitherto been necessary to mold chocolate, or a similar substance containing almonds or other nuts, by hand, in order to get the proper results. The present invention embodies an apparatus and method of doing this work in an expeditious, efficient, and automatic manner.

The object of the invention is to provide an apparatus which will mold chocolate, or the like, containing preserved fruits or other hard bodies, in an automatic manner. The only hand work necessary on the machine, after it is once started, is the feeding of the empty molds at one end of the machine and the removal of the molded chocolate from the other end.

A more specific object is to automatically form chocolate almond bar, which is a well known article of commerce. The apparatus, however, is not limited in its broad scope to forming the chocolate containing nuts in any particular shape, as it can be seen that instead of a bar of chocolate, any suitable form may be molded.

Other objects of the invention will appear in the detailed description of the apparatus and the claims annexed to the description.

In the drawings forming part of this application,—

Figure 1 is a side more or less diagrammatic view of a complete apparatus assembled and shows the relation of the part which is the particular subject matter of this invention to other parts. Fig. 2 is a sectional view taken on the line 2—2 of Fig. 3 looking in the direction of the arrow, showing more clearly than Fig. 1 the means for feeding molds under the almond feeder and the reciprocating brushes which knead or mix the almonds and chocolate together in the molds. Fig. 3 is a plan view of Fig. 2 with parts removed showing the means for operating the feed, the shaking table, the reciprocating brushes, and the horizontally movable brush. Fig. 4 is a sectional view taken on the line 4—4 of Fig. 3 looking in the direction of the arrow and showing the means for operating the horizontally movable brush. Fig. 5 is a sectional view taken on the line 5—5 of Fig. 3 showing the means for reciprocating the brushes and for operating the shaking table along which the molds are fed. Fig. 6 is a sectional view (a plan view being shown in Fig. 3) of one of the molds showing the relation of the depth of the molds to the thickness of the almonds or other bodies in the chocolate.

Almonds are taken as illustrating the kind of material it is desired to mold chocolate with, but it is to be understood that walnuts, hazel nuts, preserved fruits, and the like have been successfully treated in this apparatus. For convenience almonds are used to illustrate the class. If the hollow of each mold could receive the almonds so that the latter did not project above the top of the mold, then a scraper could be used to smooth off the chocolate in the molds. However, a scraper can not be used if the almonds do project above the top of the mold, as is the case when thin bars of chocolate are desired, for if it were used the scraper would tear away the almonds and chocolate and injure the product. By means of this apparatus thin bars of chocolate almond can be molded and turned out uniform in quality and appearance.

Referring to Fig. 1, *a* is a track or runway on which the molds 20 are fed. The chain *b* provided with driving lugs as shown (suitably driven) feeds these molds along and they pass under the chocolate feeding device *c*. The specific means for filling the molds with chocolate may be as shown by the patent to A. H. Savy No. 941,537, Nov. 30, 1909, or otherwise as there are many known methods of filling molds with chocolate alone in an automatic manner. They are then filled with chocolate and pass to the main feeding wheels *d* (see Figs. 2 and 3), which accurately determine the proper feed of the molds with relation to the feed of the almonds in the molds, as will be later described. The molds are fed by these wheels along the track and under the almond feeder *e*. The almonds are here placed in definite number upon the top of the chocolate in each mold. The chocolate molds with the almonds on top then pass under reciprocating brushes $f$. These brushes are shown in two series of four each, but as many as desired may of course be used to accomplish the function now to be described. As the molds pass under the brushes they also pass over a shaking table $g$. The construction of a shaking table is well understood, and the illustration herein is merely diagrammatic to show its location under and between the track $a$. This table is rapidly shaken up and down at the same time that the brushes are reciprocated by means which will be later described. The brushes $f$ knead or mix the almonds and chocolate together and the shaking table aids in the operation of completely mixing the two substances. When the molds leave the shaking table and proceed along the track or runway $a$, the almonds, although projecting above the top of the molds as stated, are covered completely with chocolate and thoroughly held by the body of the chocolate; a horizontally reciprocable brush $h$ wipes the top of the chocolate bars as they pass thereunder, all of which can be clearly seen from the drawings. The last operation is on the shaking table $i$, (shown diagrammatically with its operating mechanism) where each mold with its chocolate, is well shaken. The operation is then finished.

While the general operation may be understood from the above description, a more detailed account of the specific means for carrying out the function of the apparatus will now be given.

The hand-wheel $k$ is used to tension the chain $b$ in a well known manner. An endless belt $l$ (suitably mounted in the machine, see Fig. 1) is driven continuously underneath the shaking table $g$ to return whatever chocolate drops from the molds back into the chocolate receptacle $p$ in the manner indicated in Fig. 1. This receptacle $p$ is mounted on wheels and a track so that it can be put in and out of place conveniently. There is a shaft mounted horizontally in the receptacle which is driven by means of the wheel $q$ which is connected to any suitable driving shaft. On the horizontal shaft are mounted a stirring means and a conveying means $r$. The latter indicates any suitable conveyer which will elevate the chocolate from the tank to the conveyer $s$, suitably mounted and rotatable to elevate the chocolate to a point where it may be scraped off by the vertically adjustable scraper $t$ and from there pass into the chocolate feeder $c$, all as indicated in Fig. 1. This tank and chocolate elevating means specifically form no part of this invention and for that reason it is only indicated on the drawing in diagrammatic form.

The tank $p$, elevating means, chocolate feeder $c$, and mold feeding wheels $d$ are all shown within a casing 21 which is used to inclose the parts in order that the temperature may be kept constant. This feature is, of course, important in molding a material such as chocolate. There are suitable openings in the casing for the belt $l$, the tracks $a$, and the molds to pass through; also for the other driving means shown. These openings, however, are so small that the temperature within the casing is not affected thereby to any appreciable degree.

The gear train $v$ suitably driven consists of suitable cone pulleys and connections, as indicated, to drive the fan $u$ and the chocolate stirrer 15 contained in the chocolate feeder. The fan is connected by the pipe shown to the lower part of the casing and takes the air heated by the electric heating device 5 which is controlled in its operation by a hand regulated thermostat device 4 and blows the heated air to the lower part of the casing. A proper circulation is thus maintained which will keep the temperature constant in all parts of the casing. The operator may set the thermostat for the desired temperature after which it will make and break the circuit through the heater according as the temperature falls below, or rises above, the desired temperature. A scraper $y$, mounted adjustably, is used to even off the chocolate after it has been fed to the molds.

The casing may be made up in any suitable manner, as indicated in the drawings, with angle irons and sheet iron provided with suitable windows and doors as desired. A casing also surrounds the brushes and reciprocating table under the brushes, (both mentioned above) as clearly indicated in Fig. 1. A steam-pipe 6 is used to keep this part of the apparatus at the desired temperature. The showing in the drawings of the casing 21 and parts contained therein is to be understood as illustrative only of the general arrangement. These parts and their function are well understood by those skilled in this art.

The almond feeding means will now be described with relation to the mold feeding means: Referring to Figs. 3 and 6 of the drawings, it will be seen that the molds 20 are made up in blocks of six each in rectangular shape, so that they fit one against the other when passing along the runway $a$. The feed-wheels $d$ have teeth, each of which fits in one of the hollows of a mold to advance said mold. These teeth are arranged in three sets of three each and between each set there is a break. The teeth of the almond feeding wheel $e$ are arranged in a similar manner, that is there are three hollows and then a thick tooth (see Fig. 2). The shafts of two wheels are suitably mounted in the machine and connected to operate together by means of the chain connection 31. As the molds are fed along the track the abutting edges, indicated by the double line in Fig. 3 of two blocks of molds enter the space between the sets of teeth on the feed wheel. At the same time it is so arranged that the abutting edges of two other molds are directly under the thick tooth on the almond feeding wheel. It will thus be seen that as two abutting edges of any two molds pass under the almond feeding wheel no almonds will be fed, but whenever a hollow of a mold is under the wheel that hollow will receive the almonds contained in one hollow of the feed-wheel. The feed of the molds along the track-way is therefore exactly adjusted to the feed of the almonds to the molds. This is a very important feature of the invention for it insures an exact uniform product.

The manner of feeding the almonds from the hopper 6 to the feed-wheel $e$ is as follows: A valve 8 is loosely hinged at one end to the hopper, as seen in Fig. 2, and the other end rests against the periphery of the feed-wheel $e$. As the latter rotates, its teeth cause the valve 8 to flap against the vertically regulable brush 7. In the manner indicated, the outlet of the hopper can not only be opened to allow the almonds to enter the hollows of the feed-wheel when they pass the outlet, and closed when the teeth pass the outlet, but the contents of the hopper may be stirred up also and thus keep the feed from the hopper even and regular. The brush 9 coöperates with the peculiar shape of the teeth in the feed-wheel $e$ to keep the same number, practically, of almonds in each hollow of the wheel as it passes to the discharge point. These teeth, instead of being of the same form front and back are, as shown, formed with an abrupt or radial surface on one side and a gradual or more nearly tangential surface on the other. They are rather in the nature of saw teeth but arranged backward in respect to the wheel's rotation. The wheel $e$ rotates in a clockwise direction. The proper number of almonds can find lodgment in the deep hollow back of each tooth while the surplus will be quickly swept by the brush 9 up the gradual incline on the front of the next tooth and they will drop into the hollow back of said tooth and prevent as many almonds being fed to that tooth as would otherwise be the case. The almond feeder and mold driving devices are as in my co-pending application, Serial No. 644,978. It will be understood that the hopper and feed devices extend transversely of the machine. An apron 10 is formed partly around the brush 9 and feed-wheel $e$ to prevent the almonds from falling out of place.

The manner of mounting and reciprocating the brushes $f$ is best shown in Fig. 5. Mounted along one side of the machine is the main driving shaft 11 having on one end thereof the tight and loose pulleys 30 and 31. On this shaft 11 are arranged a series of eccentrics 32 one for each brush $f$. A sleeve embraces each eccentric 32, and, when the latter is turned with shaft 11, this sleeve is raised and lowered to operate the link 34 adjustably connected to link 35. The latter is pivoted on the frame at 33 and has at its inner end a gear segment engaging teeth in the rack 36. This rack is mounted for vertical reciprocating movement in the frame and is connected to a U-shaped member having bearings in which the brush $f$ is mounted for free rotation. This mechanism for reciprocating the brushes is shown clearly in Fig. 5 and is in each case the same. Certain brushes may, however, move downwardly while the others move upwardly, this being arranged as desired by a proper settling of the series of eccentrics 32 on the shaft 11. As the molds move along the trackway $a$, the brushes are reciprocated, and the bristles thereof enter the molds to thoroughly mix the nuts and chocolate together. The desired movement of the brushes can be obtained by moving the connection of rods 34 with 35 away from or toward the centers or pivot points 33. The brushes are free to rotate in their bearings and, therefore, will present different working surfaces to mix the material in the molds. A belt 37 running over suitable pulleys connects shaft 11 with the shaft 38 of the almond-feeding wheel. As before stated, chain 31 connects the latter with shaft 39 on which the mold feeding wheels $d$ are fixed. The two cross-shafts 40 for operating the shaking table are connected for operation by the chain 13, and one of these shafts (see Fig. 3) is connected to shaft 11 by suitable bevel gears.

The reciprocating or shaking table $g$ operates as is clearly indicated in Fig. 2. The toothed wheels 12 are connected to operate together by means of the chain 13. The teeth on the wheel, rotating as the arrow shows, rub by the lugs 14 fixed on the under side of the table and thus shake it up and down. Fig. 5 shows in what manner the table shakes the molds as the brushes are reciprocated to enter the molds. The way in which the brush $h$ is reciprocated horizontally is clear from Fig. 4, which shows an eccentric 41 mounted on the shaft 11 to operate the adjustable bell-crank lever mechanism 45 which is connected to the horizontally mounted brush bar $h$. The brush bar $h$ is mounted to slide horizontally in lugs extending from the cross-plate 46. The latter is mounted adjustably in vertical ways in the upstanding portions 47. This brush may therefore, by the construction described be regulated by the thumb-screw shown in Fig. 2 to bear lightly or heavily on the chocolate. After the molds leave the shaking table *g* they pass along the track out of the casing and on to the shaking table *i* where they are shaken and cooled at the same time. The product is thus given a rich nutty appearance. This shaking table *i* operates as indicated and a detailed description thereof is thought unnecessary as the drawing shows a simple cam-operated shaking table of well-known construction.

It can be seen that in each block of molds, as shown in Fig. 3, there are six compartments. There may, however, be as many as desired, but in any given case the almond feeding wheel may be made to correspond exactly with the number of compartments. Where it does correspond, the hollows of the almond feeding wheel will correspond with the compartments and the big teeth of the wheel, as described above, will correspond with the passing of the abutting edges of the two blocks of molds under the feedwheel. Where the compartments of the molds are divided from one another by walls at right angles to each other, then the hollows of the almond feeding wheel should be correspondingly divided by walls at right angles to the wheel's axis. This will insure an equal number of almonds being fed to each compartment or hollow of the molds. In the case illustrated, there must be one dividing wall for the feeding wheel, to correspond to the short dividing wall of each mold block.

Applicant is aware that machines for filling molds with chocolate in an automatic manner are not new but are well-known in the art. The particular features for filling the molds with chocolate have, therefore, only been diagrammatically shown. Applicant discloses in this application the combination with a chocolate molding machine of means to feed other material to the molds in a uniform manner and means to thoroughly mix the two materials in the molds. The invention is shown in its preferred form but may be carried out in other specific forms than the one shown. It is defined in the annexed claims rather than by the foregoing specific description.

What I claim is—

1. The combination of a mold, an apparatus to receive said mold comprising guiding means for the mold, means to fill the mold with chocolate arranged adjacent to the guiding means, a device adapted to feed hard bodies to the mold also arranged adjacent the guiding means, and means arranged to act on the material in said mold to thoroughly knead and mix the hard bodies in the chocolate, said means comprising members movable at an angle to the surface of the molds.

2. The combination of a series of molds, a trackway therefor, driving devices to move said molds along the trackway, a chocolate feeding device mounted above the track and arranged to feed chocolate to the molds, means to heat said chocolate feeder and said molds while adjacent the feeder, a container for nuts, a feeding device adjacent the container and above the trackway to feed nuts to the chocolate in the molds as the latter pass along the trackway, said feeding means and said driving device being connected so that the rate of feeding the nuts is proportioned to the rate at which the molds are driven by said feeding device, and means to knead the nuts and chocolate together in the molds arranged adjacent to the track.

3. The combination of a track, molds formed to fit one against the other to move along the track, driving devices to move the molds along the track, a casing, said track passing through said casing by suitable openings, means to keep the interior of said casing at a constant temperature high enough to melt chocolate, a chocolate feeding means in said casing adjacent to the trackway to feed chocolate to the molds, a nut feeding device adjacent the track connected to said driving devices to operate therewith and feed nuts to the chocolate in the molds at a rate proportionate to the rate at which the molds move along the track, a shaking table arranged under the track provided with means to operate it to shake the molds filled with chocolate and nuts as they pass along the track, an endless belt mounted under said track to return any material falling therefrom to said chocolate feeding means in said casing, and means mounted adjacent the track to enter the molds to knead the chocolate and nuts together in the molds.

4. In a device for molding chocolate and nuts, the combination of molds, an apparatus to receive the molds comprising means to fill the molds with chocolate, and means to place nuts on top of the chocolate, means to keep said apparatus at the proper temperature, together with means for mixing the chocolate and nuts together in the molds.

5. In a molding apparatus, the combination of a trackway, molds adapted to move along said trackway, and means mounted adjacent said trackway to enter the molds and mix the material which the molds are adapted to contain as said molds move along the trackway.

6. In a molding apparatus, the combination of a trackway, molds adapted to move along the trackway, a device for feeding material to the molds, driving means to move the molds along the trackway, another device for feeding different material to the molds, comprising a hopper, a rotatable wheel mounted below the hopper operable by a driving connection with said driving means to regulate and measure the feed from the hopper to each mold to the speed of the molds along the trackway, and a device mounted to enter the molds and mix the material therein.

7. The combination of a trackway, molds to move along said trackway, feeding means mounted above the molds adapted to feed liquid thereto, driving means to move the molds along the track, a second feeding means above the track adapted to feed measured quantities of solids to each mold, said second feeding means and said driving means being connected to operate together and determine the quantity of solids fed in proportion to the number of molds passing along the track, means to enter said molds and thoroughly mix the liquid and solids in the molds.

8. In a chocolate molding apparatus, the combination of a series of molds, a guide-way for said molds, mechanism to move said molds evenly along said guide-way, mechanism to feed measured quantities of an article to each mold as it passes along the guide-way, and driving means connecting the moving mechanism and the feeding mechanism, and a reciprocating device arranged to enter each mold and mix the material held therein.

9. In a chocolate molding apparatus, the combination of a series of molds, mechanism to feed chocolate to said molds, mechanism arranged to feed nuts to said molds on top of the chocolate in measured quantities, means to guide the molds by and adjacent to each of said mechanisms, means rotatably and reciprocably mounted, driving means for reciprocating said means at an angle to the travel of the molds, said guiding means arranged to guide the molds under the said rotatably mounted means after they have been filled with chocolate and nuts for the said rotatably mounted means when reciprocated to work the nuts and chocolate together in the molds.

10. In a chocolate molding machine, the combination of molds adapted to contain chocolate and nuts, and arranged to travel through the machine, a support for said molds and means mounted to reciprocate at an angle to the travel of the molds adjacent to said support, means for reciprocating said reciprocating means, said support and said reciprocating means being mounted so that the reciprocating means can knead the chocolate and nuts together in the molds.

11. A chocolate molding apparatus, comprising, molds, devices for feeding chocolate and nuts thereto, a support along which the molds may travel, a shaking device adapted to operate adjacent said support, said device when operated acting to shake the molds and material therein, means mounted to reciprocate at an angle to the top faces of the molds and arranged to mix the material in the molds as the latter are operated on by said shaking device.

12. In a chocolate molding apparatus, the combination of molds with means for filling said molds with chocolate, means for inserting nuts on top of the chocolate, a support for the molds, and mechanism to knead the chocolate and nuts together in the molds comprising a series of cylindrical brushes mounted above the support to rotate freely, each brush being provided with a link motion, an eccentric driving means arranged to give reciprocating movement to each brush, and means to feed the molds under brushes for the material in each mold to be subjected to the kneading action of the brushes.

13. In a chocolate molding apparatus, the combination of molds with means for filling said molds with chocolate, means for feeding nuts to said chocolate, supports for the molds, a mechanism to knead the chocolate and nuts together in the molds mounted above said supports comprising means to enter the molds to knead and mix the material therein, and a shaking table mounted between said supports and arranged to lift the molds up and down on said supports, all for the purpose described.

14. A chocolate molding apparatus comprising a set of molds, a trackway for the molds extending from one end of the apparatus to the other, driving means to move the molds along the trackway, mechanism arranged above said trackway to feed chocolate to the molds as they pass along the track, additional mechanism to likewise feed nuts to the molds, a device comprising means to knead the nuts and chocolate together in the molds, and a casing inclosing all of said mechanism, together with means for keeping the temperature in the casing constant.

15. A chocolate molding apparatus comprising a set of molds, a trackway for the molds extending from one end of the apparatus to the other, driving means to move the molds along the trackway, mechanism arranged above said trackway to feed chocolate to the molds as they pass along the track, additional mechanism to likewise feed nuts to the molds, means to knead the nuts and chocolate together in the molds, a shaking table operable between the trackway to aid the brushes in the kneading operation, a casing inclosing all of said parts, means to keep the temperature in the casing constant, an outlet in the casing, a shaking table on which the molds can be shaken and cooled at the same time, said trackway extending out of said opening and along said shaking table so that the molds can be fed from the interior of the casing to the table, all for the purpose described.

16. In a chocolate molding apparatus, a support, a mold, a chocolate feed, a nut feed, means for advancing the mold along the support, jogging means for the mold, and means for kneading the chocolate and nuts in the mold as the mold is advanced.

17. In a chocolate molding machine, and in combination, a support, a train of molds, chocolate feeding means, nut feeding means, means for moving the molds along the support, jogging means for the molds, and a plurality of reciprocating brushes for successively performing a kneading operation upon the contents of each mold as it moves along the support.

18. A chocolate molding machine, comprising, in combination, a series of multi-compartment molds adapted to pass through the machine one abutting another, devices to feed molten chocolate and relatively hard bodies to the several mold compartments, a driving means to force the molds through the machine, comprising, parts to enter the compartments of the molds said driving means being mechanically connected to the device for feeding the hard bodies to the compartments whereby said bodies will be fed to the compartments in proper timed relation to the movements of the molds through the machine.

EMILE LOUIS ALFRED SAVY.

Witnesses:
S. B. DE GOLYER,
FRANKLIN G. NEAL.